March 24, 1964
V. C. MOORE
3,125,900
POWER TRANSMISSION MECHANISM
Filed Dec. 29, 1961
3 Sheets-Sheet 1
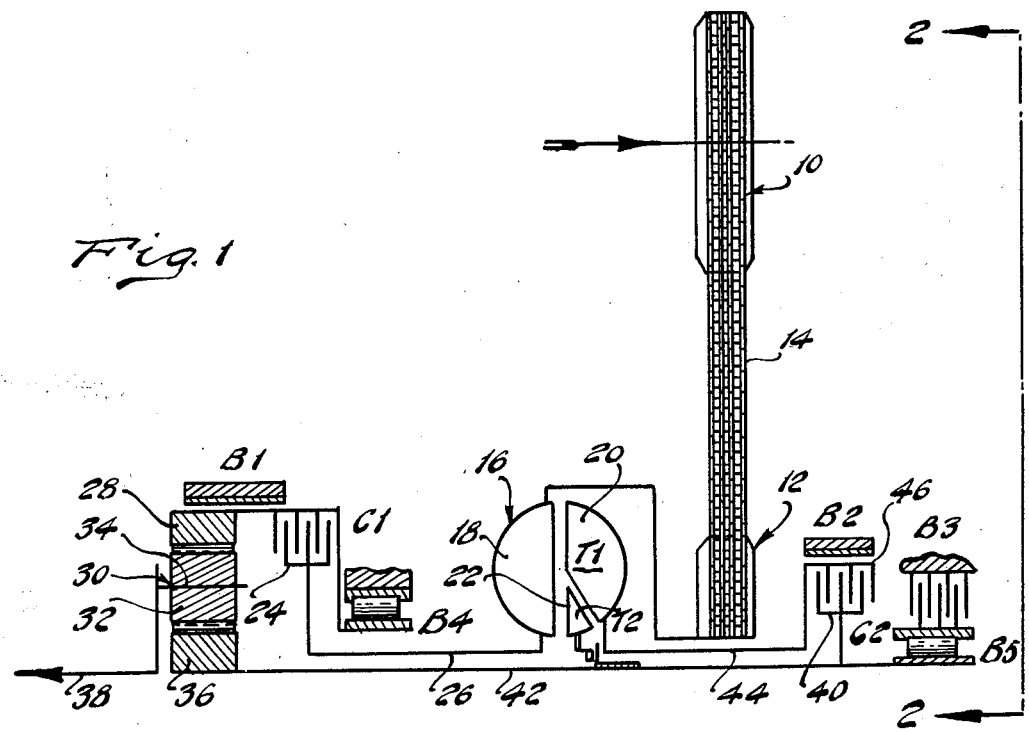
Fig. 1
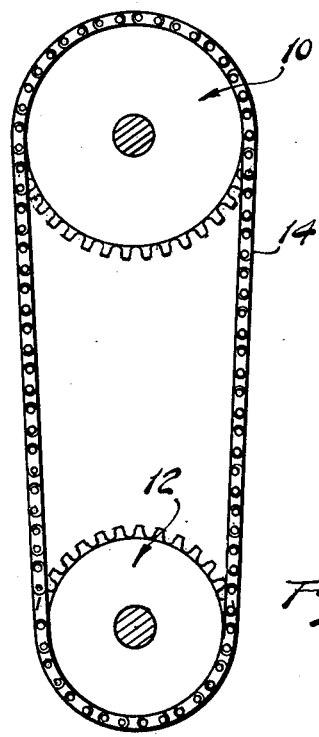
Fig. 2
Fig. 3
| SPEEDS | ELEMENTS | | | | | | | |
|---|---|---|---|---|---|---|---|---|
| | B1 | C1 | T2 | B2 | C2 | B3 | B4 | B5 |
| 1-ST | | | | | ON | ON | ON | |
| 2-ND | | ON | | | | ON | | ON |
| 3-RD | | ON | | | ON | ON | | |
| REVERSE | ON | | ON | ON | | | | |
| BRAKING | ON | | * | | ON | | | |
\* CHANGE ANGLE TO SUIT BRAKING
INVENTOR.
VICTOR C. MOORE
BY
ATTORNEYS.

INVENTOR.
VICTOR C. MOORE
BY
ATTORNEYS.

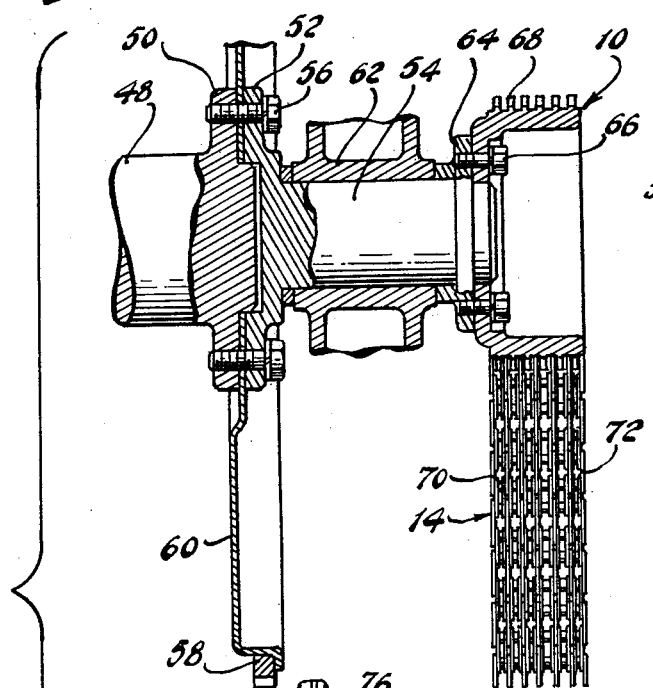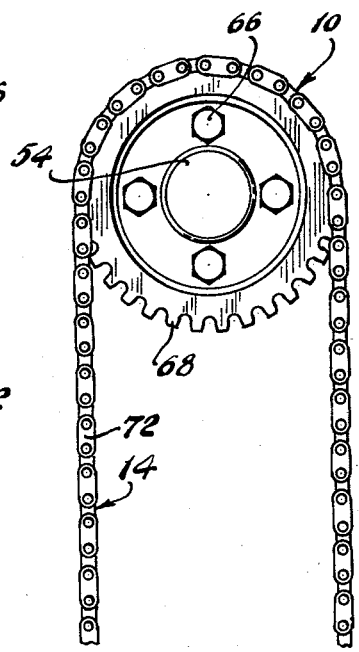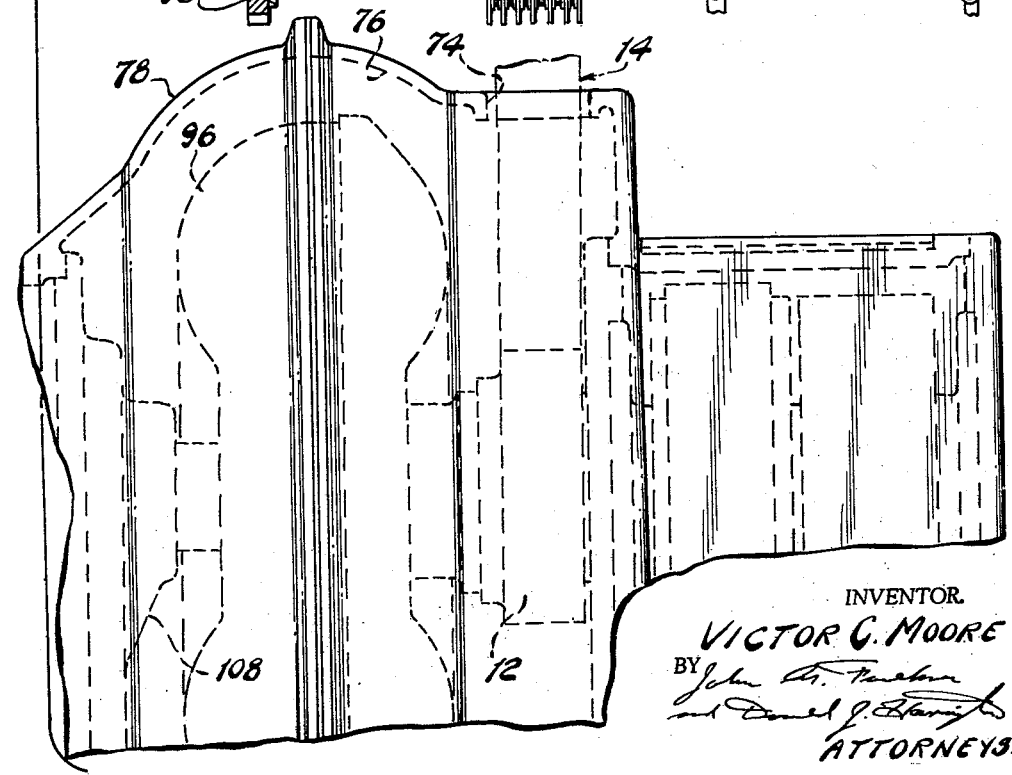

United States Patent Office 3,125,900
Patented Mar. 24, 1964

3,125,900
POWER TRANSMISSION MECHANISM
Victor C. Moore, Plymouth, Mich., assignor to Ford Motor Company, Dearborn, Mich., a corporation of Delaware
Filed Dec. 29, 1961, Ser. No. 163,150
8 Claims. (Cl. 74—688)

My invention relates generally to improvements in power transmission mechanisms, and more particularly to a power transmission mechanism for automotive vehicles that is characterized by unusual compactness in the disposition of its component elements.

Although my improved mechanism is capable of being used in vehicle drive lines of various forms, it is adapted particularly to be used with vehicles having a forwardly mounted engine and front traction wheels. In such installations the center line of the vehicle engine crankshaft is disposed substantially above the axis of the traction wheels, and it therefore is necessary to transfer driving torque from an upper level to a lower level. I accomplish this in my improved mechanism by means of a recirculating torque transfer means such as a driving chain and sprockets.

The driven sprocket is situated at the rear of the engine and below the axis of the engine crankshaft, the latter being arranged in positive driving relationship with respect to the driving sprocket. The driven sprocket is connected drivably to the transmission power output member by means of simple planetary gearing and a fluid coupling. The fluid coupling and the gearing cooperate to provide three driving speed ratios and a reverse ratio. Reverse drive is obtained by employing an auxiliary reverse turbine member and delivering the reverse torque of the auxiliary turbine member to the same gear elements that are employed for forward drive.

My improved mechanism includes also a clutch and brake arrangement for establishing nonsynchronous pickup shifts during forward drive operation.

The provision of an improved transmission mechanism of the type above set forth being a principal object of my invention, it is a further object of my invention to provide a simplified vehicle power transmission mechanism that can be adapted readily to either front wheel drive vehicles or rear wheel drive vehicles.

It is a further object of my invention to provide a power transmission mechanism of the type above set forth and which is characterized further by a low silhouette when it is employed in an automotive vehicle chassis. In rear wheel drive installations, a drive shaft normally is provided for transferring torque from a forward location to the rear driving axle. This requires a tunnel in the vehicle body understructure. It requires also a raised portion in the understructure of the forward driver's compartment to accommodate the speed ratio changing elements of the transmission. The size of this tunnel and the forward raised portion or hump can be reduced to a minimum by employing my improved structure.

It is a further object of my invention to provide a power transmission mechanism that is characterized by improved efficiency and performance.

It is a further object of my invention to provide a multiple speed power transmission mechanism of the type above set forth and which includes a hydrodynamic coupling and cooperating planetary gearing. The lowest and the highest speed ratios are obtained by transferring torque from the driven sprocket through the coupling and then delivering the coupling turbine torque to the planetary gearing. An intermediate speed ratio drive can be obtained by delivering torque directly through a fully mechanical power flow path that bypasses the fluid coupling.

Further objects and features of my improved mechanism will become apparent from the following description and from the accompanying drawings, wherein:

FIGURE 1 shows in schematic form the principal elements of my mechanism;

FIGURE 2 is a schematic view taken along section line 2—2 of FIGURE 1 showing the driving and driven sprockets and the cooperating torque delivery drive chain;

FIGURE 3 is a table showing the clutch and brake operating sequence used for obtaining the various speed ratio changes;

FIGURE 5 is a cross sectional subassembly view showing the engine driven sprocket and drive chain; and FIGURE 6 is an end view of the sprocket and drive chain of FIGURE 5.

Figure 4:
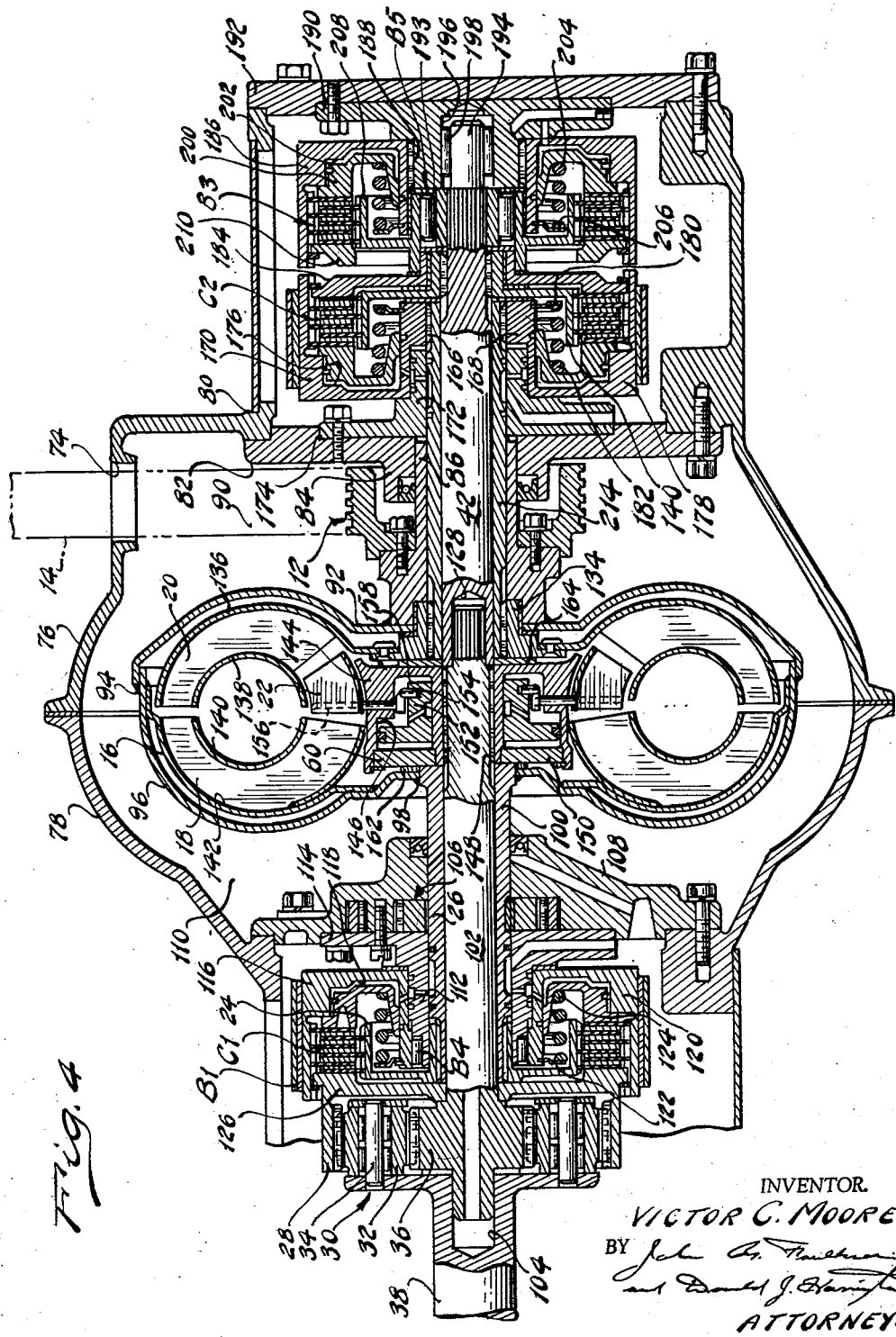
FIGURE 4 is a cross sectional assembly view of one form of my invention.

Referring first to FIGURE 1, numeral 10 designates generally a power input sprocket that is connected drivably to a vehicle engine. Sprocket 10 is coupled drivably to a driven sprocket 12 by means of a drive chain 14. The sprockets 10 and 12 rotate about the spaced parallel axes, the axis of the sprocket 10 coinciding with the axis of the crankshaft of the vehicle engine.

A hydrodynamic coupling is shown generally at 16. It includes a pump or impeller 18, a primary turbine 20 and a secondary turbine 22. The turbines 20 and 22 are designated also by the reference characters T1 and T2.

The impeller 18 and the turbines 20 and 22 cooperate in fluid flow relationship to define a toroidal fluid flow cavity in a conventional fashion.

For purposes of simplicity, only the portions of the fluid coupling 16 and the sprocket 12 on one side of the axis of the coupling is shown in FIGURE 1. The same is true for the gearing and the clutches and brakes subsequently to be described.

Impeller 18 is connected drivably to clutch member 24 of a multiple disc clutch C1. The driving connection is established by a sleeve shaft 26. Clutch C1 establishes a driving connection between shaft 26 and a ring gear member 28 for a planetary gear unit 30. A plurality of planet gears 32 is journaled upon a carrier 34, each planet gear being disposed in meshing engagement with ring gear 28 and a sun gear 36. The carrier in turn is connected drivably to a power output shaft shown at 38.

An overrunning brake B4 is provided for anchoring the ring gear 28 to the stationary transmission housing when driving torque is distributed to ring gear 28 in one direction. It will accommodate overrunning motion of the ring gear 28, however, when the torque reaction acting thereon is reversed. A selectively operable friction brake B1 is provided for anchoring the ring gear member 28 to inhibit motion thereof in either direction.

Sun gear element 36 is connected drivably to clutch member 40 of a friction clutch C2. The connection is established by a central shaft 42. Another overrunning brake B5 is provided for anchoring the shaft 42 against rotation in one direction. The other race of the brake B5 is adapted to be anchored selectively to the stationary transmission housing by means of a friction brake B3. By preference the brake B3 is of the friction disc type.

Turbine 20 is connected by means of a sleeve shaft 44 to a clutch member 46, the latter forming a part of the clutch C2. Clutch member 46 can be anchored selectively by the friction brake band B2.

In an automotive drive line installation for a front wheel drive vehicle, the power flow path would be in the direction of the arrows shown on the power input side of the sprocket 10 and on the power output shaft 38.

The power flow path for the shaft 38 would extend forwardly and the sprocket 10 would be driven by the rearward end of the engine crankshaft.

To establish first speed ratio forward drive operation, clutch C2 and brake B3 are applied. The engine torque then is delivered from sprocket 10 to sprocket 12 through the chain 10 to impeller 18. Toroidal fluid flow established in the coupling torus circuit will impart a driving torque to the turbine 20, and this torque is distributed through the applied clutch C2 to the shaft 42 thus driving sun gear 36 in a forward driving direction. The negative torque reaction of the ring gear 28 is transferred to the casing through brake B4.

The next highest speed ratio in the forward drive range is accomplished by de-energizing clutch C2 and energizing in sequence clutch C1. It thus is apparent that the torque delivered to the impeller 18 will be transferred directly through clutch C1 into the ring gear 28 and sun gear 36 will be disconnected from the turbine 20. In this instance clutch C2 is released. A negative torque reaction thus is imparted to the sun gear 30 and this is transferred to the stationary transmission housing through brake B5 and brake B3. The brake B3 can be applied during operation in all of the forward driving ratios. Thus, the engine torque is transferred mechanically through the transmission system independently of the coupling 16. There are no hydrodynamic losses due to the coupling 16 and a maximum degree of efficiency thus is achieved for acceleration purposes.

During initial starting from a standing start the coupling 16 is effective to transfer the entire engine torque to the sun gear 36 through the applied clutch C2. This is desirable during start-up since it provides a cushion and contributes to smoothness during initial acceleration.

Third speed ratio forward drive operation can be achieved by reapplying clutch C2. Thus, a portion of the engine torque transferred to sprocket 12 is delivered directly to the ring gear 28 through the clutch C1, the shaft 26 and the impeller 18. The remaining portion of the torque is transferred through the coupling 16, the turbine torque from the coupling 16 being transferred through shaft 12, energized clutch C2 and shaft 42 to the sun gear 36. About two-thirds of the available torque will be transferred through a fully mechanical torque delivery path to the power output shaft 38 and the remaining torque will be delivered to the shaft 38 hydrodynamically by means of a coupling 16. Thus, a split torque drive in third speed ratio operation is achieved. This contributes to overall smoothness in performance and a higher degree of efficiency than that which would be obtained if all of the torque were delivered hydrodynamically.

To obtain reverse drive, provision is made for adjusting the angularity of the blades of the secondary turbine 22. The primary turbine 20 is anchored during reverse drive operation by a brake band B2 and the ring gear 28 of the planetary gear unit 30 is anchored by brake band B1. A reverse driving torque thus is imparted to the turbine T2 and this reverse torque is delivered to the sun gear 36 through shaft 42. This causes reverse rotation of the power output shaft 38.

During engine braking, brake band B1 is applied and functions as a reaction member. Sun gear 36 then tends to overspeed and the torque delivered to the sun gear 36 is transferred through energized clutch C2 to the turbine T1. Torque is transferred from shaft 42 directly to the turbine T2. A reverse toroidal fluid flow thus is established and the braking torque is transferred then to the engine through the drive chain 14.

The angularity of the turbine T2 can be adjusted during engine braking conditions in order to provide the optimum degree of torque transmitting capacity of the coupling 16.

Referring next to FIGURES 4, 5 and 6, reference numeral 48 designates the rearward end of an engine crankshaft. It is flanged at 50 to permit a driving connection with a cooperating flange 52 formed on a sprocket drive shaft 54. Bolts 56 form the driving connection between shafts 48 and 54. A ring gear 58 is carried by a flexible flywheel 60 that is secured to the flange 50 by bolts 56. Ring gear 58 is adapted to be engaged by an engine starter motor pinion. Shaft 54 is journaled within suitable bracket structure 62 carried by the engine cylinder block.

Shaft 54 is flanged as shown at 64 and the aforementioned sprocket 10 is bolted by bolts 66 to the flange 64. Sprocket 10 is formed with sprocket teeth 68 as shown in FIGURE 6 and these teeth cooperate with the bearing rollers 70 situated about roller pins. The pins in turn are linked together by chain links 72. Several such rollers 70 are provided for each link, the number depending upon the torque transmitting capacity of the belt that is desired.

The chain 14 extends downwardly as viewed in FIGURE 4 and is arranged within an opening 74 formed in the housing portion 76. Housing portion 76 in turn is bolted to a cooperating housing portion 78. The two portions 76 and 78 are flanged and are bolted in end-to-end relationship to define a bell-shaped cavity within which is situated the aforementioned coupling 16.

Another housing portion 80 is secured by bolts, not shown, to the right-hand end of the housing portion 76. Housing portion 80 is substantially cylindrical in shape and accommodates the previously mentioned clutch C2 and the brake B3.

A separator wall 82 is disposed between the interior of housing portion 80 and the interior of housing portion 76. A bearing support 84 extends axially from the wall 82 and rotatably receives therein a pilot sleeve 86 to which is secured the aforementioned sprocket 12. Sleeve 86 is formed with a shoulder 88 to which the sprocket 12 is bolted by bolts 90. Sprocket 12 is engaged drivably by the aforementioned chain 14.

The sleeve shaft 86 is welded to a pump shell 92 at the hub thereof. The shell 92 encloses the primary turbine 20. The periphery of the shell 92 is welded at 94 to a juxtaposed pump shell 96, the hub of the latter being welded at 98 to sleeve shaft 100. This shaft is journaled for rotation about the central sun gear shaft 102 connected to the sun gear 36 of the aforementioned planetary gear unit 30. The end of the shaft 36 is piloted within a pilot opening 104 formed in the aforementioned power output shaft 38.

Shaft 10 is connected drivably to the driving gear of a gear pump identified generally by reference character 106. This pump includes pumping elements that are situated within the pumping chamber defined by the pump housing and a bearing support member 108 within which the shaft 100 is journaled. This member 108 is bolted to the housing portion 78 by bolts 110.

A stationary sleeve shaft 112 is carried by a pump cover plate 114 that is bolted to the member 108. Journaled upon the sleeve shaft 112 is a brake drum 116 about which the aforementioned brake band B1 is situated. When brake B1 is applied, brake drum 116 is held stationary.

The interior of the brake drum 116 defines an annular brake cylinder 118 within which is positioned an annular piston 120. The piston 120 and cylinder 118 cooperate to define an annular pressure chamber.

A spring seat 122 is carried by the sleeve shaft 112 and a piston return spring 124 is disposed between the seat 122 and piston 120 to urge the latter in a right-hand direction as viewed in FIGURE 4.

The aforementioned overrunning brake B4 is disposed between the brake drum 116 and the sleeve shaft 112. This brake drum accommodates rotation of the drum 120 with respect to the shaft 112 in one direction although rotation in the opposite direction is inhibited.

Sleeve shaft 26 is splined to clutch member 24, the latter being externally splined to internally splined clutch discs of the clutch C1. The externally splined clutch discs are splined to the interior of the drum 116.

Ring gear 28 is carried by a support member 126, the latter being keyed to the drum 116. Member 126 functions also as a back-up member for the clutch discs of clutch C1.

When pressure is applied to the working chamber defined by the piston 120 and the cylinder 118, a driving friction connection is established between shaft 126 and the ring gear 28.

Shaft 102 is received within an internally splined opening 128 in shaft 42. The end of shaft 102 thus is splined externally to provide a positive driving connection between the shafts 102 and 42.

The sleeve shaft 44 is disposed about shaft 42 and is splined to a turbine hub member 134 that in turn is secured to the outer shroud 136 of the turbine 20. Turbine member 20 includes also an inner shroud 138 that cooperates with shroud 136 to define a toroidal fluid flow passage within which turbine blades are situated. In a similar fashion, pump 18 is formed with an inner shroud 140 and a cooperating outer shroud 142. These pump shrouds define a toroidal fluid flow passage within which pump blades are situated. The outer pump shroud 142 is spot welded or otherwise secured to the periphery of the shell 96 and also to the hub portion of the shell 96.

The auxiliary turbine 22 includes a hub 144 that is formed with an inner cavity that defines an annular cylinder 146. The hub 144 is keyed at 148 to shaft 42.

An annular piston 150 is positioned within cylinder 146 and includes an extension 152 having an annular recess 154 within which the inner ends of blade actuating shafts 156 are received. A snap ring 158 located in a snap ring groove in the piston portion 152 establishes a mechanical connection between the piston 150 and the shafts 156.

A plurality of turbine blades is provided and each blade has a shaft 156, the inner end being offset as indicated.

The end of the cylinder 146 is closed by closure member 160. Closure member 160 can be ported suitably to permit communication between the converter torus circuit and the space between the member 160 and the piston 150. When fluid pressure is distributed to the working chamber defined in part by the right-hand side of the piston 150, the piston 150 is shifted in a left-hand direction thus adjustably positioning the blades of the turbine 22 that are carried by shafts 156. When fluid pressure is relieved from the working chamber, the circuit pressure in the torus circuit is sufficient to urge the piston 150 in a right-hand direction thus adjustably positioning the blades of the turbine 22 to the original angular position. When the servo for the turbine 22 is pressurized in the above-described fashion, the angularity of the blades is such that a reverse torque will be imparted to the shaft 42. The turbine 20 is anchored as previously explained during reverse drive operation.

Thrust bearings 162 and 164 are situated on either axial side of the hub 144 for the turbine 22 to accommodate axial thrust in either direction.

Shaft 44 is splined at 166 to the hub 168 of a brake drum 170 about which is positioned the previously described brake band C2. Drum 170 is journaled upon a stationary shaft extension 172 formed on a plate 174 bolted to wall 82. Drum 170 defines a cylinder 176 within which is slidably positioned an annular piston 178. A spring seat 180 is carried by the hub portion 168 and a piston return spring 182 is located between seat 180 and the piston 178 to urge the latter in a left-hand direction as viewed in FIGURE 4. Drum 170 is splined internally to accommodate a driving connection with externally splined clutch discs of the clutch C2 that are carried by an externally spline clutch member 40. Clutch member 40 in turn is splined to the shaft 42.

A clutch back-up member 184 is keyed to drum 170 and accommodates the reaction force applied to the discs of clutch C2. A driving connection is established between shaft 42 and drum 170 when fluid pressure is applied to the pressure chamber defined in part by the piston 178.

A stationary brake drum 186 is splined to an extension 188 formed on plate 190, the latter being bolted to an end cover plate 192 secured to the open end of housing portion 80. The inner race for the rollers of brake B5 is in the form of a ring 193 that is splined to the end of shaft 42. An extension 194 of shaft 42 is journaled in a bore 196 in the extension 188 by bearing 198.

An annular piston 200 is positioned within an annular cylinder 202 defined by the drum 186. This annular piston 200 is urged in a right-hand direction by piston return spring 204 that is seated against a spring seat 206 anchored to the hub of brake drum 186. An externally splined brake member 208 is piloted upon the aforementioned member 184. This same member 208 defines an outer race for the rollers of the aforementioned overrunning brake B5.

Brake discs are splined to the periphery of member 208 and cooperating ring discs are splined to the internally splined interior of brake drum 186. A brake pressure back-up plate 210 is connected also to the brake drum 186.

When fluid pressure is admitted to the working chamber defined in part by the brake piston 200, the member 208 becomes braked to the stationary housing. The brake discs for brake B3 thus function as a means for transferring the torque reaction of the overrunning brake B5 to the housing portion 80.

Having thus described a preferred form of my invention, what I claim and desire to secure by United States Letters Patent is:

1. A power transmission mechanism comprising a hydrodynamic unit and a simple planetary gear unit, said hydrodynamic unit comprising an impeller, a primary turbine and a secondary turbine disposed in toroidal fluid flow relationship, said gear unit comprising a sun gear, a ring gear, a carrier and planet gears journaled on said carrier in meshing engagement with said sun and ring gears, first friction clutch means for coupling together said primary turbine and said sun gear, a releasable reaction brake, first overrunning brake means for anchoring said sun gear against said reaction brake while accommodating rotation of said sun gear in the opposite direction, second friction clutch means for coupling together said impeller and said ring gear, means for drivably connecting said impeller to a prime mover, said carrier being connected to a driven member, second overrunning brake means for inhibiting rotation of said ring gear in one direction while accommodating rotation thereof in the opposite direction, said secondary turbine being drivably connected to said sun gear, and means for selectively braking said primary turbine and said ring gear to accommodate reverse torque delivery from said secondary turbine to said sun gear.

2. A power transmission mechanism comprising a hydrodynamic unit and a simple planetary gear unit, said hydrodynamic unit comprising an impeller, a primary turbine and a secondary turbine disposed in toroidal fluid flow relationship, said gear unit comprising a sun gear member, a ring gear member, a carrier member and planet gears journaled on said carrier member in meshing engagement with said sun and ring gear members, first friction clutch means for coupling together said primary turbine and a first of said members, a releasable friction brake, first overrunning brake means for anchoring said first gear member against said friction brake while accommodating rotation thereof in the opposite direction, second friction clutch means for coupling together said impeller and a second of said members, means for drivably connecting said impeller to a prime mover, the third of said members being connected to a driven member, second overrunning brake means for inhibiting rotation of said second member in one direction while accommodating rotation thereof in the opposite direction, said secondary turbine being drivably connected to said first member, and means for selectively braking said primary turbine and said second member to accommodate reverse torque delivery from said secondary turbine to said first member.

3. A power transmission mechanism for transferring power from an engine to a driven member, said mechanism comprising a hydrodynamic unit and a simple planetary unit, said hydrodynamic unit comprising an impeller, a primary turbine and a secondary turbine disposed in toroidal fluid flow relationship, said gear unit, comprising a sun gear member, a ring gear member, a carrier member and planet members journaled on said carrier member in meshing engagement with said sun and ring gear members, the axis of said planetary gear unit coinciding with the axis of said hydrodynamic unit, the axis of said engine being offset from the axis of said gear unit and said hydrodynamic unit, first friction clutch means for coupling together said primary turbine and a first of said members, a releasable reaction brake, overrunning brake means for anchoring said first member against said reaction brake while accommodating rotation thereof in the opposite direction, second friction clutch means for coupling together said impeller and a second of said members, the third of said members being coupled to a driven member, means for drivably connecting said impeller to said engine including a flexible torque transmitting member, a pair of drive wheels over which said torque transmitting member is trained, one drive wheel being mechanically connected to said impeller and the other being mechanically connected to said engine, said secondary turbine being drivably connected to said first member, and means for selectively braking said primary turbine and said second member to accommodate reverse torque delivery from said secondary turbine to said first member.

4. A power transmission mechanism for transferring power from an engine to a driven member and comprising a hydrodynamic unit and a simple planetary gear unit, said hydrodynamic unit having an impeller, a primary turbine and a secondary turbine disposed in toroidal fluid flow relationship, said gear unit comprising a sun gear, a ring gear, a carrier and planet gears journaled on said carrier in meshing engagement with said sun and ring gears, the axis of said engine being offset with respect to the axis of said gear unit and said hydrodynamic unit, first friction clutch means for coupling together said primary turbine and said sun gear, a releasable reaction brake, overrunning brake means for anchoring said sun gear against said reaction brake while accommodating rotation thereof in the opposite direction, second friction clutch means for coupling together said impeller and said ring gear, means for drivably connecting said impeller to said engine comprising a pair of drive wheels, one drive wheel being coaxial with and connected to said impeller and the other drive wheel being coaxial with and connected to said engine, a flexible torque transmitting member trained over said drive wheels to establish a driving connection therebetween, said carrier being connected to said driven member, second overrunning brake means for inhibiting rotation of said ring gear in one direction while accommodating rotation thereof in the opposite direction, said secondary turbine being connected drivably to said sun gear, and means for selectively braking said primary turbine and said ring gear to accommodate reverse torque delivery from said secondary turbine to said sun gear.

5. A power transmission mechanism comprising a hydrodynamic unit and a simple planetary gear unit, said hydrodynamic unit comprising an impeller, a primary turbine and a secondary turbine disposed in toroidal fluid flow relationship, said gear unit comprising a sun gear, a ring gear, a carrier and planet gears journaled on said carrier in meshing engagement with said sun and ring gears, first friction clutch means for coupling together said primary turbine nad said sun gear, a releasable reaction brake, first overrunning brake means for anchoring said sun gear against said reaction brake while accommodating rotation thereof in the opposite direction, second friction clutch means for coupling together said impeller and said ring gear, means for drivably connecting said impeller to a prime mover, said carrier being connected to a driven member, second overrunning brake means for inhibiting rotation of said ring gear in one direction while accommodating rotation thereof in the opposite direction, said secondary turbine being drivably connected to said sun gear, means for selectively braking said primary turbine and said ring gear to accommodate reverse torque delivery from said secondary turbine to said sun gear, said secondary turbine comprising a plurality of angularly spaced blades disposed in the toroidal fluid flow path of said hydrodynamic unit, and means for adjustably positioning said blades to provide a reversely directed hydrodynamic torque whereby said mechanism is conditioned for reverse drive operation.

6. A power transmission mechanism comprising a hydrodynamic unit and a simple planetary gear unit, said hydrodynamic unit comprising an impeller, a primary turbine and a secondary turbine disposed in toroidal fluid flow relationship, said gear unit comprising a sun gear member, a ring gear member, a carrier member and planet gears journaled on said carrier member in meshing engagement with said sun and ring gear members, first friction clutch means for coupling together said primary turbine and a first of said members, a releaseable reaction brake, first overrunning brake means for anchoring said first gear member to said reaction brake to inhibit rotation thereof in one direction while accommodating rotation thereof in the opposite direction, second friction clutch means for coupling together said impeller and a second of said members, means for drivably connecting said impeller to a prime mover, the third of said members being connected to a driven member, second overrunning brake means for inhibiting rotation of said ring gear in one direction while accommodating rotation thereof in the opposite direction, said secondary turbine being connected drivably to said sun gear, means for selectively braking said primary turbine and said ring gear to accommodate reverse torque delivery from said secondary turbine to said sun gear, said secondary turbine comprising a plurality of angularly spaced blades disposed in the toroidal fluid flow path of said hydrodynamic unit, and means for adjustably positioning said blades to provide a reversely directed driving torque whereby said mechanism is conditioned for reverse drive operation.

7. A power transmission mechanism for transferring power from an engine to a driven member, said mechanism comprising a hydrodynamic unit and a simple planetary unit, said hydrodynamic unit comprising an impeller, a primary turbine and a secondary turbine disposed in toroidal fluid flow relationship, said gear unit comprising a sun gear member, a ring gear member, a carrier member and planet members journaled on said carrier member in meshing engagement with said sun and ring gear members, the axis of said planetary gear unit coinciding with the axis of said hydrodynamic unit, the axis of said engine being offset from the axis of said gear unit and said hydrodynamic unit, first friction clutch means for coupling together said primary turbine and a first of said members, overrunning brake means for inhibiting rotation of said first member while accommodating rotation thereof in the opposite direction, second friction clutch means for coupling together said impeller and a second of said members, the third of said members being coupled to a driven member, means for drivably connecting said impeller to said engine including a flexible torque transmitting member, a pair of drive wheels over which said torque transmitting member is trained, one drive wheel being mechanically connected to said impeller and the other being mechanically connected to said engine, said secondary turbine being drivably connected to said first member, means for selectively braking said primary turbine and said second member to accommodate reverse torque delivery from said secondary turbine to said first member, said secondary turbine comprising a plurality of angularly spaced blades disposed in the toroidal fluid flow path of said hydrodynamic unit, and means for adjustably positioning said blades to provide a reversely directed hydrodynamic torque whereby said mechanism is conditioned for reverse drive operation.

8. A power transmission mechanism for transferring power from an engine to a driven member and comprising a hydrodynamic unit and a simple planetary gear unit, said hydrodynamic unit having an impeller, a primary turbine and a secondary turbine disposed in toroidal fluid flow relationship, said gear unit comprising a sun gear, a ring gear, a carrier and planet gears journaled on said carrier in meshing engagement with said sun and ring gears, the axis of said engine being offset with respect to the axis of said gear unit and said hydrodynamic unit, first friction clutch means for coupling together said primary turbine and said sun gear, overrunning brake means for inhibiting rotation of said sun gear while accommodating rotation thereof in the opposite direction, second friction clutch means for coupling together said impeller and said ring gear, means for connecting drivably said impeller to said engine comprising a pair of drive wheels, one drive wheel being coaxial with and connected to said impeller and the other drive wheel being coaxial with and connected to said engine, a flexible torque transmitted member trained over said drive wheels to establish a driving connection therebetween, said carrier being connected to said driven member, second overrunning brake means for inhibiting rotation of said ring gear in one direction while accommodating rotation thereof in the oppose direction, said secondary turbine being drivably connected to said sun gear, means for selectively braking said primary turbine and said ring gear to accommodate reverse torque delivery from said secondary turbine to said sun gear, said secondary turbine comprising a plurality of angularly spaced blades disposed in the toroidal fluid flow path of said hydrodynamic unit, and means for adjustably positioning said blades to provide a reversely directed hydrodynamic torque whereby said mechanism is conditioned for reverse drive operation.

References Cited in the file of this patent

UNITED STATES PATENTS

| | | |
|---|---|---|
| 845,850 | Carter | Mar. 5, 1907 |
| 2,091,356 | Fawcett | Aug. 31, 1937 |
| 2,302,714 | Pollard | Nov. 24, 1942 |
| 2,312,849 | Pollard | Mar. 2, 1943 |
| 2,352,004 | Pollard | June 20, 1944 |
| 2,695,533 | Pollard | Nov. 30, 1954 |
| 2,968,197 | De Lorean | Jan. 17, 1961 |
| 3,016,768 | De Lorean | Jan. 16, 1962 |

UNITED STATES PATENT OFFICE
CERTIFICATE OF CORRECTION

Patent No. 3,125,900            March 24, 1964

Victor C. Moore

It is hereby certified that error appears in the above numbered patent requiring correction and that the said Letters Patent should read as corrected below.

Column 8, line 2, for "nad" read -- and --; column 10, line 3, for "transmitted" read -- transmitting --.

Signed and sealed this 8th day of September 1964.

(SEAL)
Attest:

ERNEST W. SWIDER            EDWARD J. BRENNER
Attesting Officer            Commissioner of Patents